US012632982B2

(12) United States Patent (10) Patent No.: US 12,632,982 B2
Köhler et al. (45) Date of Patent: May 19, 2026

(54) METHOD AND APPARATUS FOR DETERMINING A GAZE DIRECTION OF A USER

(71) Applicant: e.solutions GmbH, Ingolstadt (DE)

(72) Inventors: Thomas Köhler, Fürth (DE); Shahrooz Zarei, Ingolstadt (DE); Sergiu Deitsch, Nuremberg (DE)

(73) Assignee: E.SOLUTIONS GMBH, Ingolstadt (DE)

( * ) Notice: Subject to any disclaimer, the term of this patent is extended or adjusted under 35 U.S.C. 154(b) by 378 days.

(21) Appl. No.: 18/187,890

(22) Filed: Mar. 22, 2023

(65) Prior Publication Data

US 2023/0326069 A1 Oct. 12, 2023

(30) Foreign Application Priority Data

Mar. 22, 2022 (EP) ..................................... 22163630
Feb. 23, 2023 (EP) ..................................... 23158163

(51) Int. Cl.
*G06T 7/73* (2017.01)
*G06T 7/60* (2017.01)
(Continued)

(52) U.S. Cl.
CPC .................. *G06T 7/73* (2017.01); *G06T 7/60* (2013.01); *G06V 10/82* (2022.01); *G06V 40/193* (2022.01);
(Continued)

(58) Field of Classification Search
CPC ..... G06F 21/6245; G06F 16/23; G06F 21/602
See application file for complete search history.

(56) References Cited

U.S. PATENT DOCUMENTS 10,928,904 B1 2/2021 Novelli
2020/0014541 A1* 1/2020 Streit .................. H04L 63/0861
(Continued)

FOREIGN PATENT DOCUMENTS

CN 112417953 * 2/2021
EP 3243162 B1 11/2017
(Continued)

OTHER PUBLICATIONS

Wang et al., "Study on Eye Gaze Estimation", IEEE Transactions on Systems, Man, and Cybernetics—Part B: Cybernetics, vol. 32, No. 3, Jun. 2002 (Year: 2002).*
(Continued)

*Primary Examiner* — Qian Yang
(74) *Attorney, Agent, or Firm* — Tarolli, Sundheim, Covell & Tummino LLP

(57) ABSTRACT

Disclosed is a method for determining a gaze direction of a user (5) by employing a neural network (220) operating on the basis of image data of an image of a face of the user (5). The neural network (220) detects an ellipse (20) representing an outer border of an iris (17) of the user's eye (15) and outputs a first vector (31), a second vector (32) and a respective first and second probability ($p_1$, $p_2$) representing the probability that the first vector (31) or the second vector (32) is the gaze direction Further disclosed are an apparatus configured to perform such method and a vehicle comprising such apparatus.

14 Claims, 5 Drawing Sheets

Figure 1:
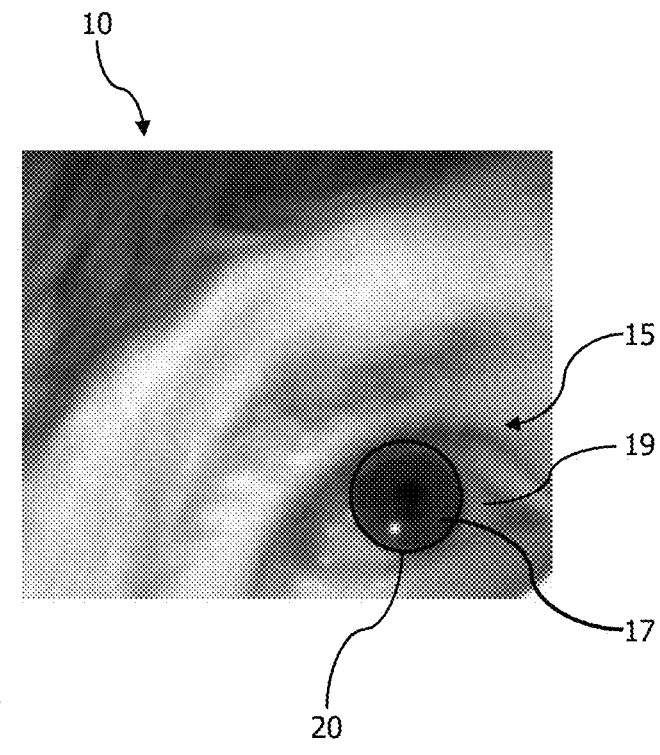

(51) Int. Cl.
    *G06V 10/82*        (2022.01)
    *G06V 40/18*        (2022.01)

(52) U.S. Cl.
    CPC ............... *G06T 2207/20076* (2013.01); *G06T 2207/20081* (2013.01); *G06T 2207/20084* (2013.01)

(56) References Cited

U.S. PATENT DOCUMENTS

2020/0379460 A1 \* 12/2020 Stent ..................... G06V 10/82
2021/0089831 A1 \* 3/2021 Malaescu .............. G06N 3/047

FOREIGN PATENT DOCUMENTS

| EP | 3362946 | B1 | 8/2018 |
|---|---|---|---|
| WO | 2016111880 | A1 | 7/2016 |
| WO | 2017066296 | A1 | 4/2017 |
| WO | 2020110121 | A1 | 6/2020 |

OTHER PUBLICATIONS

Machine translation for CN 112417953 (Year: 2021).\*
European Search Report (EESR) for corresponding 23158163.8 completed Jun. 1, 2023.
Kothari Rakshit S et al: corresponding to "EllSeg: An Ellipse Segmentation Framework for Robust Gaze Tracking," IEEE Transactions on Visualization and Computer Graphics, IEEE, USA, vol. 27, No. 5, Mar. 29, 2021 (Mar. 29, 2021) pp. 2757-2767, XP011849836, ISSN: 1077-2626, DOI:10.1109/TVCG.2021.3067765 [retrieved on Apr. 15, 2021] \* figure 2; section 5.1 last sentence\*.
Ghosh Shreya et al: corresponding to "Automatic Gaze Analysis: A Survey of Deep Learning based Approaches", Aug. 11, 2021 (Aug. 11, 2021), XP093050755, DOI: 10.48550/arxiv.2108.05479 Retrieved from the Internet: URL:https://arxiv.org/pdf/2108.05479v2.pdf [retrieved on May 31, 2023] Aug. 11, 2021, figure 6.
Wang, et al., "Study on Eye Gaze Estimation", IEEE Transactions on Systems, Man, and Cybernetics—Part B: Cybernetics, vol. 32, No. 3, Jun. 2002, XP11079908A.
Farouk, et al., "Iris Recognition System Techniques: A Literature Survey and Comparative Study", 5th International Conference on Computing and Informatics, pp. 194-198.
Xia, et al., "IR Image Based Eye Gaze", Eighth ACIS International Conference on Software Engineering, Artificial Intelligence, Networking, and Parallel/Distributed Computing, DOI 10.1109/SNPD. 2007.237, pp. 220-224.
Zhang, et al., "Appearance-Based_Gaze_Estimation_2015_CVPR_ paper", pp. 4511-4520.
Poitschke, Tony Matthias, "Blickbasierte Mensch-Maschine Interaktion", Technische Universität München, pp. 3-203.
European Search Report issued in connection with corresponding European Patent Application No. 22163630.1-1207 dated Sep. 2, 2022.

\* cited by examiner

METHOD AND APPARATUS FOR DETERMINING A GAZE DIRECTION OF A USER

RELATED APPLICATIONS

The present invention is a U.S. Nonprovisional Application claiming priority to European Patent Application No. 22163630.1 filed 22 Mar. 2022 and European Patent Application No. 23158163.8 filed 23 Feb. 2023; the entireties of both are hereby incorporated herein by reference.

The estimation of a gaze direction becomes more and more important in various fields. For instance, human machine interfaces are under current development, such as allowing user input by "selecting" an item on a display by looking at the item. This allows user interaction without using an input device controlled by hand, for example, when operating machinery or supporting handicapped people.

Estimating the gaze direction is of particular interest in the automotive industry, for instance when a gaze direction of the eyes of a driver is of interest. On the one hand, a human machine interface may be controlled by looking at a displayed item, a vehicle component may be controlled by looking at the component or a control device thereof, and a driver assistance system may operate based on information of a gaze direction, particularly if the driver looks at an object outside of the vehicle or in a rear mirror or the like. For instance, an automotive heads-up display may show important information to the driver in an area of the windshield, where the driver looks through, or the driver assistance system may warn the driver about a situation outside of the driver's field of view, or the like.

Current systems for estimating a gaze direction of a user require information about the user. For example, such systems require knowledge about a relationship between the camera and the head of the user (such as distance, head pose with respect to an image plane of the camera, etc.), or such systems are user dependent, i.e. are calibrated for a particular user who has to log into the system.

However, the determination of a gaze direction may fail. Particularly, if the required knowledge cannot be derived due to failure or erroneous information (such as missing or erroneous prior images of the eye) or an underlying module (head tracker, user authentication, etc.) provides a false output, the determination of the gaze direction will most likely not be correct. Thus, there are multiple sources of error, each of which can lead to a false gaze direction estimation.

Therefore, it is an object of the present invention to provide a reliable and efficient method and apparatus for determining a gaze direction of a user.

This object is solved by a method comprising the features of claim 1, an apparatus comprising the features of claim 13, and a vehicle comprising the features of claim 14.

Preferred embodiments are defined by the dependent claims.

According to a first aspect to better understand the present disclosure, a method for determining a gaze direction of a user comprises capturing an image of a face of the user, and providing image data of the captured image to a neural network. The neural network can be a convolutional neural network, such as a deep convolutional neural network. The neural network can be configured to receive the image data, for example, pixel values of the captured image, and perform (convolutional) operations on the pixel values.

Particularly, the neural network is configured to detect an ellipse representing an outer border or contour of an iris of the user's eye. The outer border of the iris can be detected due to the change of colour and/or contrast between the iris and the sclera. The outer border of the iris in the real three-dimensional coordinate system is (almost) circular. However, in the majority of the cases, a two-dimensional image of the iris slightly deviates from a circle and forms an ellipse due to perspective distortion. The orientation of the iris (plane) with respect to an image plane of the camera (e.g., a sensor plane) is usually not perpendicular. Thus, the outer border of the iris projects (maps) onto pixels of the camera sensor that are arranged along an ellipse.

The neural network is further configured to output a first vector, a second vector and a respective first and second probability, wherein the first and second vector respectively correspond to one of two possible normals through a centre of the ellipse, and wherein the first probability represents the probability that the first vector is the gaze direction, and the second probability represents the probability that the second vector is the gaze direction. Since only a two-dimensional image of the (almost) circular iris (arranged arbitrarily in the three-dimensional space) is available from the camera, an ambiguity with respect to the orientation of the iris in the three-dimensional space has to be solved by the neural network. While certain parameters of the ellipse can be determined, the direction of the iris in the real three-dimensional coordinate system may have at least two options, i.e. there are two options for the normal vector of the iris plane. For instance, the same ellipse may result from an iris irrespective of the user looking to the right or to the left as well as the user looking up or looking down. The neural network is trained to determine the information on the ellipse and the first and second normal vectors, and to output a first probability for the first vector and a second probability for the second vector, each specifying which vector is more likely to be the correct gaze direction. The neural network can, of course, also output the first and second normal vector.

The method further comprises determining the gaze direction of the user as the first vector, if the first probability is greater than the second probability, and as the second vector, if the second probability is greater than the first probability. Thus, the method is capable of specifying a gaze direction of the user solely from image data captured by the camera. It is not necessary to derive information about a head pose of the user before determining the gaze direction. Furthermore, it is also not necessary to derive information about other biometric features of the face of the user, such as a location of the nose, eyebrows, other parts of the eye or the like. Thus, the method is independent of additional information that may be error-prone, so that the method is more reliable. The method is also faster and more efficient than current gaze direction determination systems, since no estimations on a head pose or eye orientation have to be conducted before calculating a gaze direction. In addition, the method can be performed on only one image, so that a dependency on previously captured images of the user as in conventional systems can be obviated.

As a mere example, the neural network can be based on a convolutional neural network, such as ResNet, particularly ResNet 34 or ResNet 50, or any other neural network configured to receive image data (e.g., pixel data, pixel values or the like) and output a feature representation of the image data. For instance, the feature representation (the output of the last layer of the neural network) may include a plurality of features, such as 1024 or even 2048 features or any arbitrary number of features. It is to be understood that any other available neural network can be employed.

Furthermore, the training of such neural network takes place in advance as is common practice. A plurality of neural networks are available that are pre-trained on large datasets, such as ImageNet, consisting of thousands of images. It is, hence, possible to implement such a pre-trained neural network and to further configure it to become the neural network of the present disclosure.

Specifically, a (pre-trained) neural network can be adapted and/or (fine-) trained to determine the information on the ellipse and the first and second normal vectors. Since available neural networks do not provide geometric information about an ellipse present in the image data, the (pre-trained) neural network is further configured to evaluate the geometric representation of the ellipse (of the iris), and further to output a probability of the first and second normal vectors. In other words, the output of the adapted and/or further trained neural network is the probability for each normal vector, which could be interpreted as classifying an input image into one of several possible vectors and the corresponding probabilities of such classes.

In an implementation variant, the neural network can be configured to detect the ellipse in terms of a geometric representation of the ellipse. In other words, the neural network can be configured to determine geometric information describing the ellipse, including at least one of a position or centre of the ellipse, a rotation of the ellipse and a size of the semi-axes of the ellipse. Thus, the neural network is further trained to determine (or calculate in the layers closer to the output side of the network) the geometric information based on the feature representation of the image data, which the previous layers calculated. Compared to conventional neural networks, the neural network of the present disclosure has been adapted by outputting geometric information describing an ellipse found in the image data.

In a further implementation variant, the neural network can comprise a plurality of basic layers trained to output features forming a mathematical representation of the image data. As a mere example, the plurality of basic layers may correspond to a conventional (pre-trained) neural network. On the other hand, the plurality of basic layers may form a portion of a conventional (pre-trained) neural network.

The neural network can further comprise at least one intermediate layer configured to convert the mathematical representation of the image data into numerical values defining the ellipse. The numerical values can include the at least one of a position or centre of the ellipse, a rotation of the ellipse and a size of the semi-axes of the ellipse. The at least one intermediate layer, hence, is configured to convert the plurality of features (e.g., 1024 or 2048 to name a few) into 5 dimensions (x, y, sa, sb, angle) representing the ellipse, or 6 dimensions, if the angle is represented by two parameters (normal vector and unitary vector, allowing reconstruction of the 2-D rotation matrix as the vectors are orthogonal to one another) to enable a continuous orientation representation. Thus, while conventional neural networks may determine features from image data, the neural network of the present disclosure is capable of determining the numerical values representing an ellipse in the image.

In yet a further implementation variant, the at least one intermediate layer can be trained on the basis of a specific set of images each comprising an image of a face and including at least one eye. The training can be performed using the entire network (the basic layers together with the intermediate layers), wherein the basic layers are not changed, but only the intermediate layers. Alternatively, the basic layers may also be trained (changed) together with the intermediate layers on the specific set of images.

In another implementation variant, the neural network can be formed by supplementing the at least one intermediate layer to a pre-trained neural network. In other words, the pre-trained neural network forms the plurality of basic layers. The pre-trained neural network can be an available conventional neural network that has been trained on available datasets (such as a ResNet 34 or 50 being trained on ImageNet). The at least one intermediate layer can then be implemented at the end of the pre-trained neural network. Since available pre-trained neural networks (here the basic layers) are trained on all kinds of images and, hence, output rather general feature representations, the at least one intermediate layer provides an ellipse-specific adaptation to the output feature representations of the basic layers.

Alternatively, the neural network can be formed by replacing at least one layer of the pre-trained neural network with the at least one intermediate layer. For instance, one or more of the last layers of the pre-trained neural network can be replaced by the at least one intermediate layer.

In yet another implementation variant, the at least one intermediate layer can comprise at least two layers, wherein a first layer is a convolutional layer and the last layer (e.g., a second layer) is a linear layer. Alternatively or additionally, a/the first layer can calculate/determine the centre of the ellipse and the lengths of the semi-axes, while a second (or the last) layer can calculate/determine the rotation angle of the ellipse.

In an implementation variant, the neural network can be configured to detect an ellipse representing an outer border of the pupil. Thus, the neural network may detect an ellipse representing the inner edge (circumference) of the iris, which forms the pupil. The remaining method steps can also be performed on the basis of such an ellipse. Since the outer contour of the iris may be better detected due to stronger contrast differences against the sclera, the outer contour of the iris may be easier. However, the detection of the iris or the pupil are interchangeable for the present disclosure.

In another implementation variant, each of the first and second vector can be a three-dimensional vector having its origin in the centre of the detected ellipse and being perpendicular to a plane defined by the ellipse in a three-dimensional space. When the iris is assumed to lie on a plane, a normal to this plane corresponds to the gaze direction. The first and second vectors represent possibilities for such normal, when starting from the two-dimensional image of the iris (i.e., the ellipse). It is to be understood that the first and second vector do not need to have their respective origin in the centre of the ellipse. The first and second vector can be arranged anywhere with respect to the ellipse, but are contemplated as being perpendicular to the plane defined by the iris in the three-dimensional space. Nevertheless, if the origin of the vector is set to the centre of the ellipse, the origin of the vector in the real three-dimensional coordinate system will substantially coincide with the centre of the pupil, which is also of interest when estimating a gaze direction. It is to be understood that in the captured image of the eye, due to a distortion when the user does not look straight into the camera, the centre of the pupil may not coincide with the centre of the iris.

Specifically, the neural network can detect the ellipse in terms of the geometric representation of the ellipse, such as a position, rotation and size of the semi-axes of the ellipse. For instance, the neural network can determine each normal by assuming the iris plane as an intersecting plane in a cone, the apex of the cone being the focal point of the camera. However, as already indicated, the two-dimensional ellipse in the image data includes an ambiguity about the direction of the iris in the three-dimensional space and, hence, the gaze direction of the eye. There are five degrees of freedom for each vector. But starting from the already calculated ellipse centre (x, y), semi-major and semi-minor axis length $(s_a, s_b)$, and ellipse orientation ($\alpha$), the neural network can determine the yaw angle and pitch angle of each possible normal of the ellipse. Yaw and pitch angle of each normal are contemplated from the camera (image plane).

In another implementation variant, the neural network can be configured to calculate a roll and pitch of each of the first and second normal with respect to a coordinate system defined by an image plane of the captured image.

In yet another implementation variant, the neural network can comprise a first neural network configured to receive the image data of the captured image, to detect the ellipse representing the outer border of the iris, and to output geometric information describing the ellipse. Thus, the first neural network can be specialized and specifically trained to detect the ellipse representing the iris. For instance, the first neural network can comprise the plurality of basic layers and the at least one intermediate layer.

In addition, the neural network can comprise a second neural network configured to receive the geometric information describing the ellipse, and to calculate and output the first vector, the second vector, and the respective first and second probability. Thus, the second network may receive as an input the geometric information output by the first neural network.

In a further implementation variant, both networks (the first and second neural networks) can be trained with the same training data. This allows more confident results as the solutions of both networks can influence themselves.

Alternatively, both networks can be trained on different training data, one specific for detection of an iris (for the first network) and another for estimating a gaze direction (for the second network). This provides more flexibility of the training process, since the training of both networks can take place individually.

Further alternatively, only the first neural network is trained, while the second network is not changed. Nevertheless, the output of the second network can be used to train the first neural network, in order to improve the results of the entire network.

In yet a further implementation variant, the second neural network can be configured to classify the geometric information of the first and second vector and the respective first and second probability. For instance, the first and second vector can be directly calculated in the second neural network, and further, and the second neural network can be trained to derive and output the respective first and second probability.

In a further implementation variant, the method can further comprise outputting geometric information describing the ellipse. This output of geometric information, such as the calculated ellipse centre (x, y), semi-major and semi-minor axis length $(s_a, s_b)$, and ellipse orientation ($\alpha$), can be employed for other purposes. For instance, in an automotive system the geometric information on the ellipse, i.e. on the iris, may be used for driver monitoring, such as identifying tiredness or a distraction of the driver. Thus, the method and the neural network can output various information on the iris as well as the gaze direction for similar or different purposes.

In an implementation variant, the method may further comprise determining an eye region in the captured image, wherein providing image data comprises providing image data representing the determined eye region to the neural network. An eye region in a captured image may be determined based on facial (biometric) feature detection, wherein such features can be easily detected. For instance, the eye region of a human may easily be detected based on an eyebrow, a nose, an ear or similar facial features that can be easily detected based on conventional techniques. Such preselection of an area of the captured image requires less processing power than an iris detection as in some conventional systems, since the facial features are easier to derive than the rather small iris. The neural network is then not fed with image data that does not include an iris, such as a cheek, mouth or hair region of the head. This facilitates processing of the image data by the neural network. In addition, it is to be understood that the eye region in the present disclosure may mean a region in the captured image including one eye of the user or a region in the captured image including both eyes of the user.

In a further implementation variant, the neural network can be further configured to detect another ellipse representing a contour of an iris of a second eye of the user and to determine the first and second probability at least partly based on spatial information of the other ellipse. The neural network, for example, can be trained to determine the first and second probability based on the geometric representation of both ellipses, as it can be assumed that both eyes of the user have a similar gaze direction, i.e. have a very similar normal and, hence, have very similar first and second vectors (i.e., first and second normal vectors).

In yet a further implementation variant, the neural network can comprise a plurality of basic layers trained to output features forming a mathematical representation of the image data (including both eyes), and the neural network further comprises at least one intermediate layer configured to convert the mathematical representation of the image data into numerical values defining the ellipse and/or the other ellipse. As for the case where the image data covers only one eye, here the numerical values include at least one of a position or centre, a rotation ($\alpha$) and a size of the semi-axes $(s_a, s_b)$ of the ellipse (20) and/or the other ellipse (20).

According to a second aspect to better understand the present disclosure, an apparatus comprises a camera, a memory configured to store computer-executable instructions for performing the method according to the first aspect or at least one of its implementation variants, and a processor configured to execute the instructions stored in the memory. The apparatus can be, for example, an electronic device, such as a mobile phone, a tablet computer, a laptop, a PC, etc., or a device mounted in a vehicle, machine or the like.

According to a third aspect to better understand the present disclosure, a vehicle comprises an apparatus according to the second aspect. The processor of the vehicle's apparatus may be a dedicated processor or may form part of a vehicle computing system, such as an engine control unit (ECU). The processor of the vehicle's apparatus may output data representing the determined gaze direction. For instance, the output data may be received by an advanced driver assistance system (ADAS), which employs the information on the gaze direction for assisting the driver.

According to another aspect to better understand the present disclosure, a computer readable medium can store computer executable instructions that, when executed by a processor, allow the processor to perform the method according to the first aspect or at least one of its implementation variants. For example, the computer-readable medium can be a volatile or non-volatile memory, such as a CD, DVD, USB-stick, RAM, ROM memory or the like.

The present disclosure is not restricted to the aspects and variants in the described form and order. Specifically, the description of aspects and variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

Figure 2:
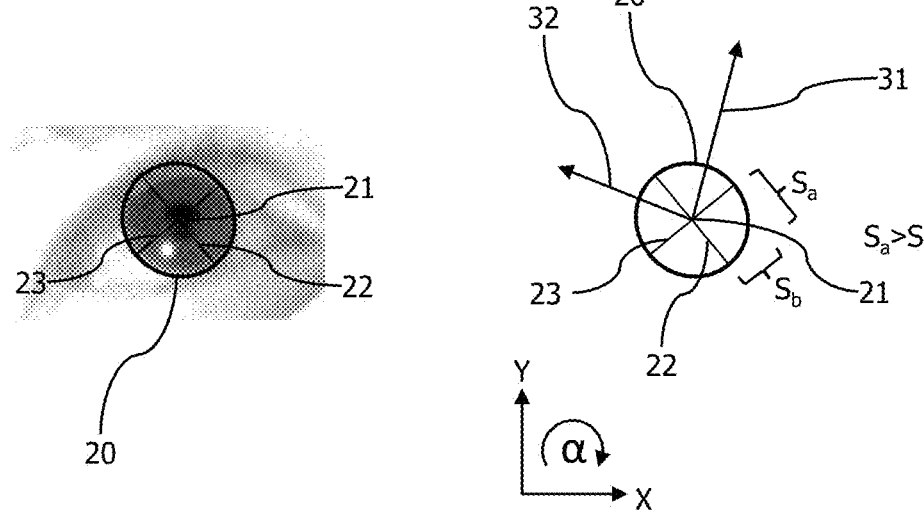
Figure 3:
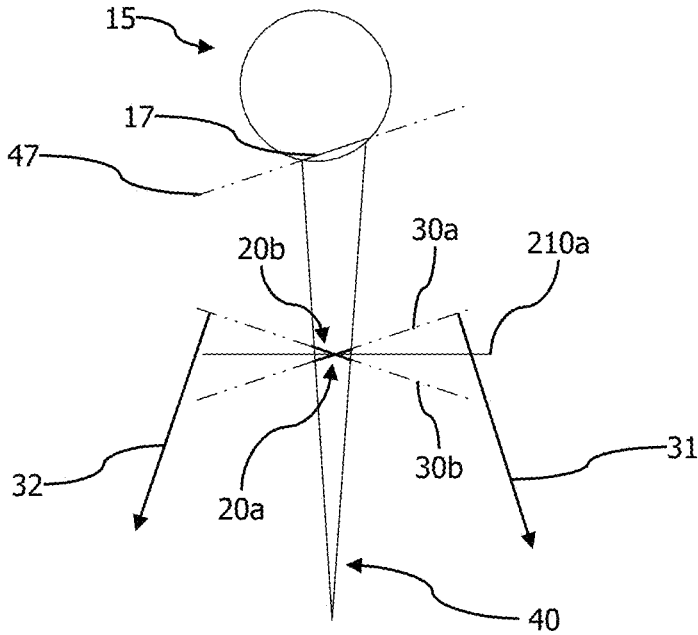
Figure 4:
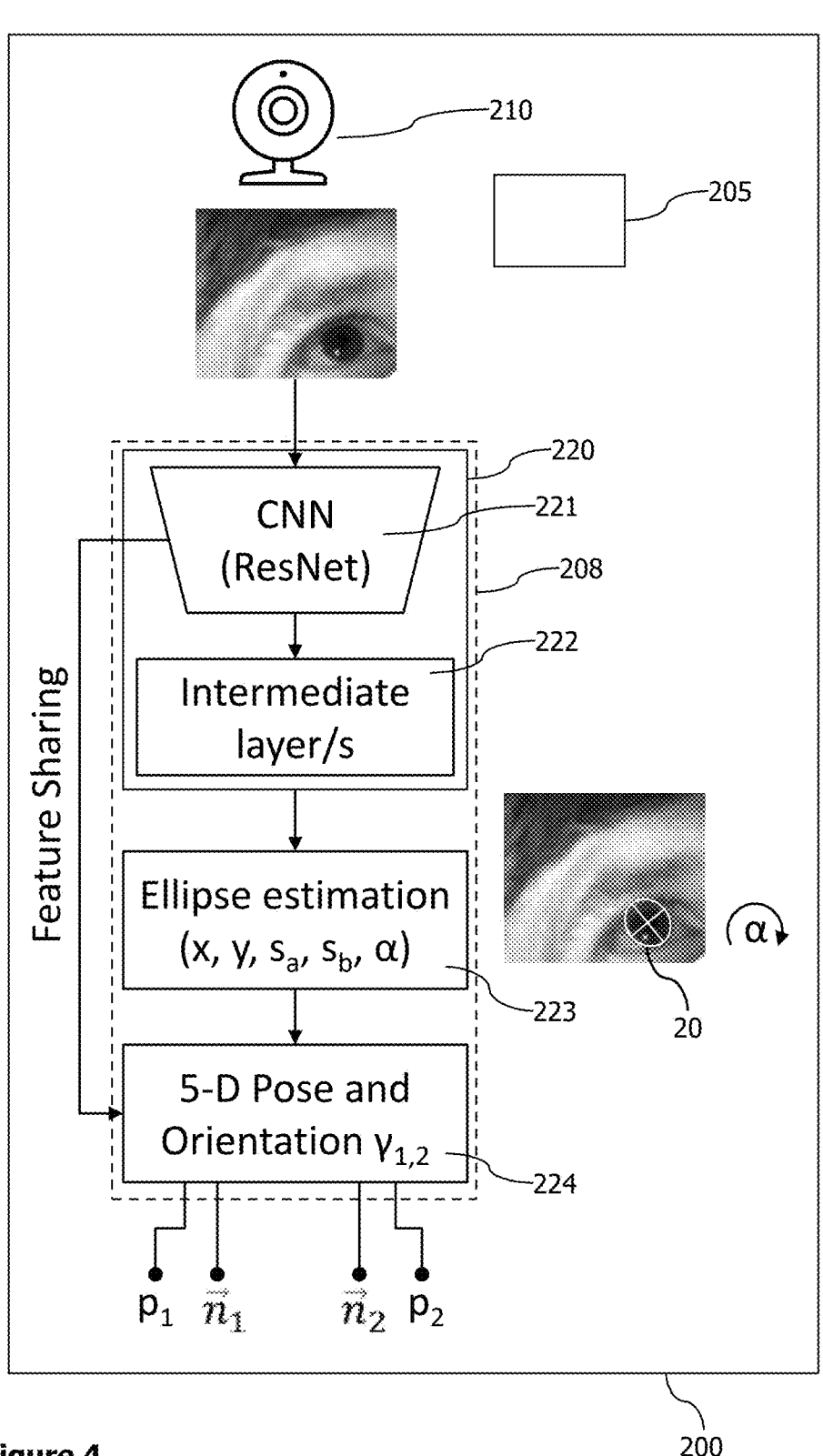
Figure 5:
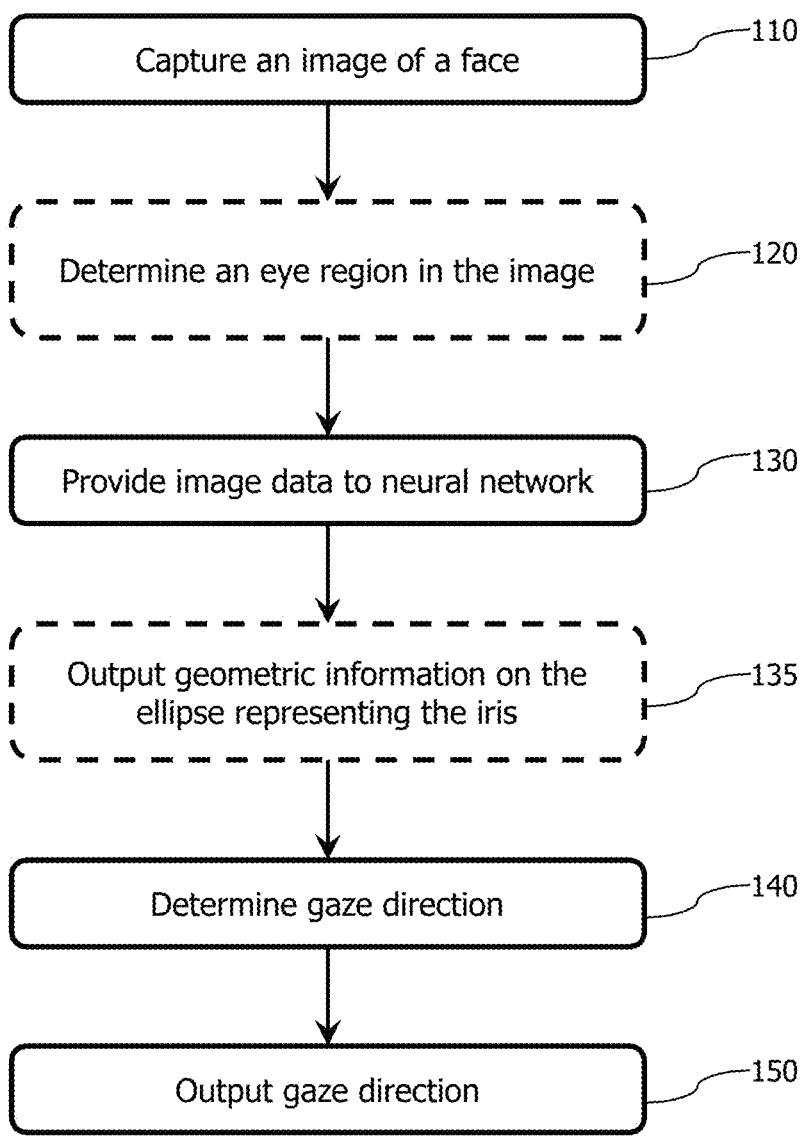
Figure 6:
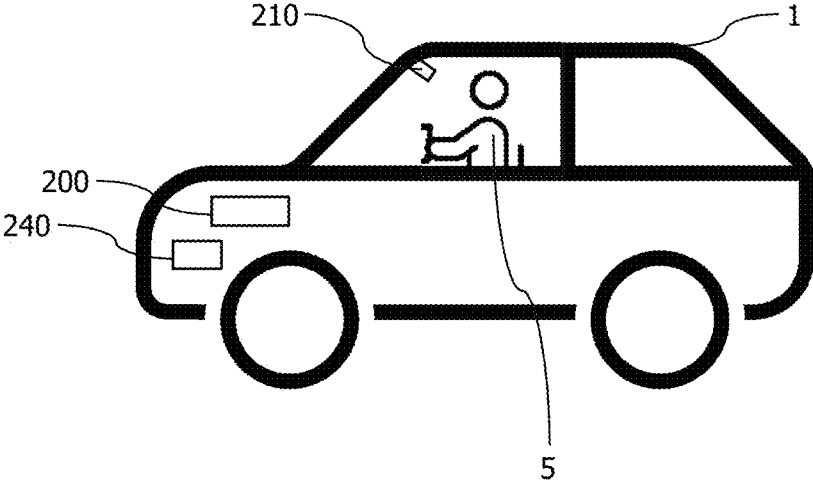

Preferred embodiments of the invention are now explained in greater detail with reference to the enclosed schematic drawings, in which FIG. 1 depicts an image of an eye region of a face, FIG. 2 schematically illustrates an exemplary determination of an ellipse representing an outer border of an iris, FIG. 3 schematically illustrates an exemplary determination of an ellipse representing an outer border of an iris, FIG. 4 schematically illustrates an apparatus for determining a gaze direction, FIG. 5 schematically illustrates a flow diagram of a method for determining a gaze direction, and FIG. 6 schematically illustrates a vehicle.

FIG. 1 depicts an image of an eye region 10 of a human face, which is only partially shown. The eye region 10 may be found in a larger image based on conventional image processing. Specifically, the eye 15 of a face can be determined due to its specific form and an image region 10 including the eye 15 can then be selected from the larger image. It is to be understood that the gaze direction determination described herein may also be performed on the entire image or an image region including both eyes 15 of the user 5 (see FIG. 6), which can also be referred to as an eye region 10.

Determination of a gaze direction of the eye 15 of a user 5 focuses on an iris 17 of the eye 15, particularly an outer border (i.e. a contour) of the iris 17. This outer border of the iris 17 may be easily detected due to a change in colour and/or contrast between the sclera 19 and the iris 17 of the eye 15.

With additional reference to FIG. 2, the outer border of the iris 17 can then be described in the image data of the image as an ellipse 20. From the image data several parameters of the ellipse 20 can be determined, such as a position within the image or eye region 10, a centre 21 of the ellipse 20, a minor semi-axis 22 and major semi-axis 23 of the ellipse 20, particularly a length of the semi-axes 22, 23, and a rotation a of the ellipse 20. Such rotation a of the ellipse 20 can be determined relative to an image plane X, Y which coincides with a sensor plane or pixel plane of a camera 210 (see FIGS. 4 and 6). It is to be understood that it is also possible that the minor and major semi-axes 22, 23 may be of same length, so that the ellipse 20 is actually a circle. This situation, however, is quite seldom, e.g., if the user 5 looks straight into the camera 210.

After detecting the ellipse 20 in the image data, two normals 31, 32 are computed, one of which is perpendicular to a surface or plane of the iris 17, i.e. the surface or plane of the ellipse 20 in a real world space. Since the iris 17 is represented by an ellipse 20 in two-dimensional image data, an ambiguity of the actual three-dimensional position of the iris 17 in a three-dimensional space is inherent to the image data.

This will be explained in more detail with reference to FIG. 3 illustrating a top or plan view of an eye 15. An image plane 210a of a camera 210 (see FIG. 4) is arranged in front of the eye 15, where the ellipse 20 is captured. This ellipse represents a projection of the iris 17 in the image plane 210a.

Thus, the iris 17 can be contemplated as an ellipse 20a derived by an intersection of a first virtual plane 30a at the image plane 210a with a cone 40 beginning at the iris 17. This first virtual plane 30a is parallel to a plane 47, in which the iris 17 lies. However, a second virtual plane 30b, for example mirroring the first virtual plane 30a could form the second virtual plane 30b, intersects with the cone 40 in such a manner that an ellipse 20b is achieved that generates the same image in the image plane 210a. A normal 31 on the first virtual plane 30a corresponds to a correct gaze direction, while a normal 32 on the second virtual plane 30b corresponds to an incorrect gaze direction, but is also derivable from the ellipse 20 in image plane 210a. This ambiguity is solved as outlined below.

Turning to FIG. 4, the detection of the ellipse 20 can be performed by an apparatus 200 comprising a camera 210 and a neural network 220, 224. For instance, the apparatus 200 can comprise a memory 205 configured to store computer-executable instructions, which can be executed by a processor 208. These instructions may cause the processor 208 to perform the method disclosed herein and to implement a neural network 220, 224. It is to be understood that the neural network 220, 224 may also be implemented in a dedicated processor (not illustrated) or in any other manner. In any case, the neural network 220 may be a convolutional neural network configured to operate on image data.

After detecting the ellipse 20 in the image data, the neural network 220, 224 is further configured to compute two normals 31, 32 ($\vec{n}_1$, $\vec{n}_2$) to respective virtual planes 30a, 30b, one of which corresponds to the iris 17. The neural network 220, 224 is provided with the image data and is programmed/trained to not only detect the geometric information describing the ellipse 20, but is also trained to output a first vector 31 and a second vector 32 corresponding to the two normals 31, 32 ($\vec{n}_1$, $\vec{n}_2$) and a first probability $p_1$ and a second probability $p_2$ respectively representing the probability that the first or second vector 31, 32 is a gaze direction of the user 5. The training of the neural network 220, 224 may take place based on any image database including images showing at least a face of the user 5.

In other words, the neural network 220 is trained to detect the geometric representation of the ellipse 20 (which represents the iris 17 in the image data) and classifies this geometric representation with respect to the first and second vectors 31, 32 and determines the first and second probabilities $p_1$, $p_2$.

As a mere example, a first and a second neural network (sub-networks) can be implemented to detect the ellipse 20, and to output the vectors 31, 32 and corresponding probabilities $p_1$, $p_2$, respectively. In other words, a first sub-network 220 receives image data and outputs geometric information 223 on the ellipse/iris 17, and a second sub-network 224 receives the output 223 of the first sub-network 220 and determines the first and second vectors 31, 32 and the corresponding probabilities $p_1$, $p_2$. Such sub-networks 220, 224 may be coupled, in order to exchange or at least share features. For instance, when estimating the yaw angle $\gamma_{1,2}$ it may be advantageous to use the image features (visual features) of the first sub-network 220 in the second sub-network 224.

The second sub-network 224 performs a geometrical classification of the output 223 of the first sub-network 220. As a mere example, the second sub-network 224 is trained to estimate a pose of the ellipse and classifies the input data (geometric information 223) into the vectors 31, 32 and corresponding probabilities $p_1$, $p_2$. The pose estimation is a known method that extracts the 3D rotation (the unknown yaw angle $\gamma_{1,2}$) using eigendecomposition of the conic matrix representing the ellipse parameters and, hence, the 3D translation in camera coordinates. The calculation of the two possible solutions can be implemented as a layer of the second sub-network 224, since the involved operations are differentiable. This allows the back propagation during training of the second sub-network 224, for example using the known "Known Operator Learning". Thus, the vectors 31, 32 ($n_1$, $n_2$) are calculated directly, while the angle $\gamma_{1,2}$ (which cannot be directly calculated from the geometric information 223) and the corresponding probabilities $p_1$, $p_2$ are trained/learned using training data and the back propagation. The angle $\gamma_{1,2}$ does not need to be output, but influences the classification of the vectors 31, 32 ($n_1$, $n_2$) in the network.

Furthermore, the first sub-network 220 can be based on a conventional neural network (or at least a portion of such conventional neural network), which forms a plurality of basic layers 221. These basic layers 221 can be supplemented with at least one intermediate layer 222 or some of the basic layers 221 can be replaced by the at least one intermediate layer 222. While the basic layers 221 are trained to output features forming a mathematical representation of the image data, the at least one intermediate layer 222 is configured to convert the mathematical representation of the image data into numerical values 223 defining the ellipse 20. The numerical values can include at least one of a position or centre x, y, a rotation (such as a rotation angle α) and a size of the semi-axes $S_a$, $S_b$ of the ellipse (20).

The basic layers 221 can be implemented by using an available network, such as ResNet 34 or 50 or the like, that is pre-trained, for example, on a large set of images, such as available ImageNet.

The at least one intermediate layer 222 can then be trained on image data containing faces or ice only. Furthermore, the at least one intermediate layer 222 can comprise a first layer determining, from the mathematical representation of the image data, at least one of the position or centre x, y, and the size of the semi-axes $S_a$, $S_b$ of the ellipse 20. A second layer of the at least one intermediate layer 222 can determine, from the mathematical representation of the image data and/or the output of the first layer, the rotation (such as the rotation angle α) of the ellipse 20.

As a mere example, the first layer can be a convolutional layer, while the second layer is a linear layer. It is to be understood that the at least one intermediate layer 222 can have any arbitrary number of layers. Preferably, the last layer is a linear layer.

Moreover, the at least one intermediate layer 222 can include one or more activation functions for the neurons of at least one layer of the basic layers 221 (preferably the neurons of the last layer of the basic layers 221) and/or for the neurons of a previous layer of the at least one intermediate layer 222.

Thus, the neural network 220, 224 can solve the ambiguity by outputting a respective probability $p_1$, $p_2$ for each of the possible vectors 31, 32. The apparatus 200 may then determine the gaze direction of the user 5 based on the higher probability $p_1$ or $p_2$, particularly output or set the first vector 31 or the second vector 32 as the gaze direction depending on which probability $p_1$, $p_2$ is higher.

FIG. 5 schematically illustrates a method for determining a gaze direction of a user 5. The method may be performed by processor 208, for example, based on the computer-executable instructions stored in memory 205. The method begins in step 110 with capturing an image of a face of the user 5. The captured image data (e.g., sensor data) of the camera 210 is provided in step 130 to a neural network 220.

The neural network 220 may then determine in an optional step 120 an eye region 10 within the image. Alternatively, another logic (not illustrated) may determine the eye region 10 within the image data and provide, in step 130, only the image data representing the eye region 10 to the neural network 220.

Once the image data (of the entire image or eye region 10) is provided in step 130 to the neural network 220, the neural network 220, 224 computes the image data including detecting an ellipse 20 representing an outer border of an iris 17 of the user's eye 15, and further including outputting the first and second vectors 31, 32 and the corresponding first and second probabilities $p_1$, $p_2$.

In an optional step 135 the neural network 220 may output geometric information 223 on the ellipse 20, such as the centre 21 of the ellipse 20, the minor semi-axis 22 and major semi-axis 23 of the ellipse 20, particularly a length of the semi-axes 22, 23, and the rotation a of the ellipse 20. This information may either be used by a second sub-network 224 or another system not relying on the gaze direction, but the iris location, position, size, etc.

The method may then continue with step 140, where a gaze direction of the user 5 is determined. This determination particularly compares the first and second probabilities $p_1$, $p_2$ to one another and sets the corresponding first vector 31 or second vector 32 as the gaze direction, depending on which probability $p_1$ or $p_2$ is higher.

Finally, the gaze direction is output in step 150. For instance, the parameters defining the vector 31 or 32 are output. This may include outputting a signal and/or data representing the vector's origin and direction, which ultimately define the gaze direction when applied to the centre of the iris 17.

FIG. 6 schematically illustrates a vehicle 1. A driver or user 5 sits in the vehicle 1, for example, on a driver seat. The vehicle comprises a camera 210 capable of taking an image of at least the eye region 10 of the driver 5, and further comprises the apparatus 200 (FIG. 4). The apparatus 200 can perform the method as illustrated in FIG. 5, for example, by executing computer-executable instructions in the processor 208 of the apparatus 200. It is to be understood that the apparatus 200 may not itself include a camera 210 as illustrated in FIG. 4, but may receive image data from images captured by camera 210 installed in the vehicle 1.

The apparatus 200 can output the determined gaze direction (cf. step 150 in FIG. 5) and provide corresponding data or a signal to another vehicle component. For example, an advanced driver assistance system (ADAS) 240 may receive the output data or signal, i.e. may receive the gaze direction in form of the first vector 31 or second vector 32. The ADAS 240 may then assist the driver 5, e.g., by warning the driver of a situation out of the field of view of the driver 5, by determining a status of the driver 5 (tired, sleepy or the like) and warning the driver accordingly, by highlighting an object at which the user 5 looks at, by providing (augmenting) information about an object at which the user 5 looks at, by activating a (heads-up) display region through which the driver 5 looks, etc.

The above description of the drawings is to be understood as providing only exemplary embodiments of the present invention and shall not limit the invention to these particular embodiments.

The invention claimed is:
1. A method for determining a gaze direction of a user, the method comprising:

capturing an image of a face of the user, wherein the image is a two-dimensional (2D) image;

providing image data of the captured image to a neural network, wherein the neural network is trained to:

(i) detect an ellipse representing an outer border of an iris of the user's eye in the image data by outputting geometric parameters of the ellipse, and (ii) resolve a 3D orientation ambiguity of a plane of the iris from a 2D projection thereof based on the geometric parameters to output a first vector, a second vector and a respective first and second probability ($p_1$, $p_2$), wherein the first and second vector each originate at a center of the detected ellipse and are perpendicular to the plane of the iris in one of two possible 3D orientations derivable from projection ambiguities of the ellipse in the 2D image such that the first vector corresponds to a first candidate gaze direction and the second vector corresponds to a second candidate gaze direction, and wherein the first probability ($p_1$) represents the probability that the first vector is the gaze direction and the second probability ($p_2$) represent a likelihood that the first vector or the second vector, respectively, matches a 3D orientation of the iris plane; and determining a gaze direction of the user as the first vector, if the first probability ($p_1$) is greater than the second probability ($p_2$), and as the second vector, if the second probability ($p_2$) is greater than the first probability ($p_1$) to resolve the 3D orientation ambiguity; and providing the determined gaze direction to a vehicle system to perform at least one action based on the determined gaze direction, wherein the at least one action comprises controlling a human-machine interface of a vehicle, controlling a vehicle component, displaying a warning on a vehicle display to the user if the determined gaze direction indicates distraction or an inattentive driver status, highlighting an object at which the user is looking on the vehicle display, or activating a heads-up display region in a field of view of the user.

2. The method according to claim 1, further comprising: determining an eye region in the captured image, wherein providing image data comprises providing image data representing the determined eye region to the neural network.

3. The method according to claim 1, wherein the neural network is configured to determine geometric information corresponding to the geometric parameters describing the ellipse including at least one of a position or centre of the ellipse, a rotation ($\alpha$) of the ellipse and a size of the semi-axes ($S_a$, $S_b$) of the ellipse.

4. The method according to claim 3, wherein the neural network comprises a plurality of basic layers trained to output features forming a mathematical representation of the image data, and the neural network further comprises at least one intermediate layer configured to convert the mathematical representation of the image data into numerical values defining the ellipse, wherein the numerical values include the at least one of a position or centre, a rotation ($\alpha$) and a size of the semi-axes ($S_a$, $S_b$) of the ellipse.

5. The method according to claim 4, wherein the neural network is formed by supplementing the at least one intermediate layer to a pre-trained neural network or by replacing at least one layer of a pre-trained neural network with the at least one intermediate layer.

6. The method according to claim 1, wherein each of the first and second vector is a three-dimensional vector having its origin in the centre of the detected ellipse and being perpendicular to a plane defined by the ellipse in a three-dimensional space.

7. The method according to claim 6, wherein the neural network is configured to calculate a roll and pitch of each of the first and second normal with respect to a coordinate system defined by an image plane of the captured image.

8. The method according to claim 1, wherein the neural network further comprises a first neural network configured to receive the image data of the captured image, to detect the ellipse representing the outer border of the iris, and to output geometric information corresponding to the geometric parameters describing the ellipse, and a second neural network configured to receive the geometric information describing the ellipse, and to output the first vector, the second vector, and the respective first and second probability.

9. The method according to claim 8, wherein the second neural network is configured to classify the geometric information into the first and second vector and the respective first and second probability, wherein, preferably, the first and second vector is directly calculated and the respective first and second probability are trained.

10. The method according to claim 1, further comprising: outputting geometric information corresponding to the geometric parameters describing the ellipse.

11. The method according to claim 1, wherein the neural network is further configured to detect another ellipse representing an outer border of an iris of a second eye of the user and to determine the first and second probability ($p_1$, $p_2$) at least partly based on spatial information of the other ellipse.

12. The method according to claim 11, wherein the neural network comprises a plurality of basic layers trained to output features forming a mathematical representation of the image data, and the neural network further comprises at least one intermediate layer configured to convert the mathematical representation of the image data into numerical values defining the ellipse and/or the other ellipse, wherein the numerical values include at least one of a position or centre, a rotation ($\alpha$) and a size of the semi-axes ($S_a$, $S_b$) of the ellipse and/or the other ellipse.

13. An apparatus comprising:

a camera;

a memory configured to store computer-executable instructions for performing the method according to claim 1; and a processor configured to execute the instructions stored in the memory.

14. A vehicle comprising an apparatus according to claim 13.

* * * * *